US012701282B1

(12) United States Patent
Mogill

(10) Patent No.: US 12,701,282 B1
(45) Date of Patent: Aug. 4, 2026

(54) APPARATUS FOR AND METHOD OF GENERATING AN OPTIMIZED SEQUENTIAL LISTING

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/424,405

(22) Filed: Dec. 18, 2025

(51) Int. Cl.
H04N 21/262 (2011.01)
G06F 16/951 (2019.01)
G06F 18/21 (2023.01)
G06F 18/27 (2023.01)

(52) U.S. Cl.
CPC ..... H04N 21/26208 (2013.01); G06F 16/951 (2019.01); G06F 18/217 (2023.01); G06F 18/27 (2023.01)

(58) Field of Classification Search
None
See application file for complete search history.

(56) References Cited

U.S. PATENT DOCUMENTS 7,822,636 B1 10/2010 Ferber et al.
11,386,367 B1 7/2022 Tabrizi et al.

2007/0219859 A1* 9/2007 Huntington ........ G06Q 30/0246
705/14.66
2018/0189836 A1 7/2018 Srivastava et al.
2020/0320580 A1* 10/2020 Collet ............... G06Q 30/0244
2025/0200607 A1* 6/2025 Aich .................. G06Q 30/0242

OTHER PUBLICATIONS

O Rafieian Optimizing User Engagement Through Adaptive Ad Sequencing "Marketing Science vol. 42, No. 5, Sep.-Oct. 2023, pp. 910-933 ".

* cited by examiner

*Primary Examiner* — Junior O Mendoza
(74) *Attorney, Agent, or Firm* — CALDWELL LLC

(57) ABSTRACT

An apparatus for and method of generating an optimized sequential listing. The apparatus includes at least a processor and a memory communicatively connected to the at least a processor. The memory instructs the processor to receive a plurality of input data comprising analytics data and profile data, and determine, using one or more regression-based models, an optimal transmission time as a function of the plurality of input data. The memory further instructs the processor to determine segments of a cluster associated with the entity as a function of the profile data, determine a frequency of impressions as a function of the analytics data, generate an optimized sequential listing as a function of the optimal transmission time, the segments, and the frequency of impressions, and transmit, using a plurality of communication channels, a communication instance of the optimized sequential listing to a plurality of client devices.

20 Claims, 7 Drawing Sheets

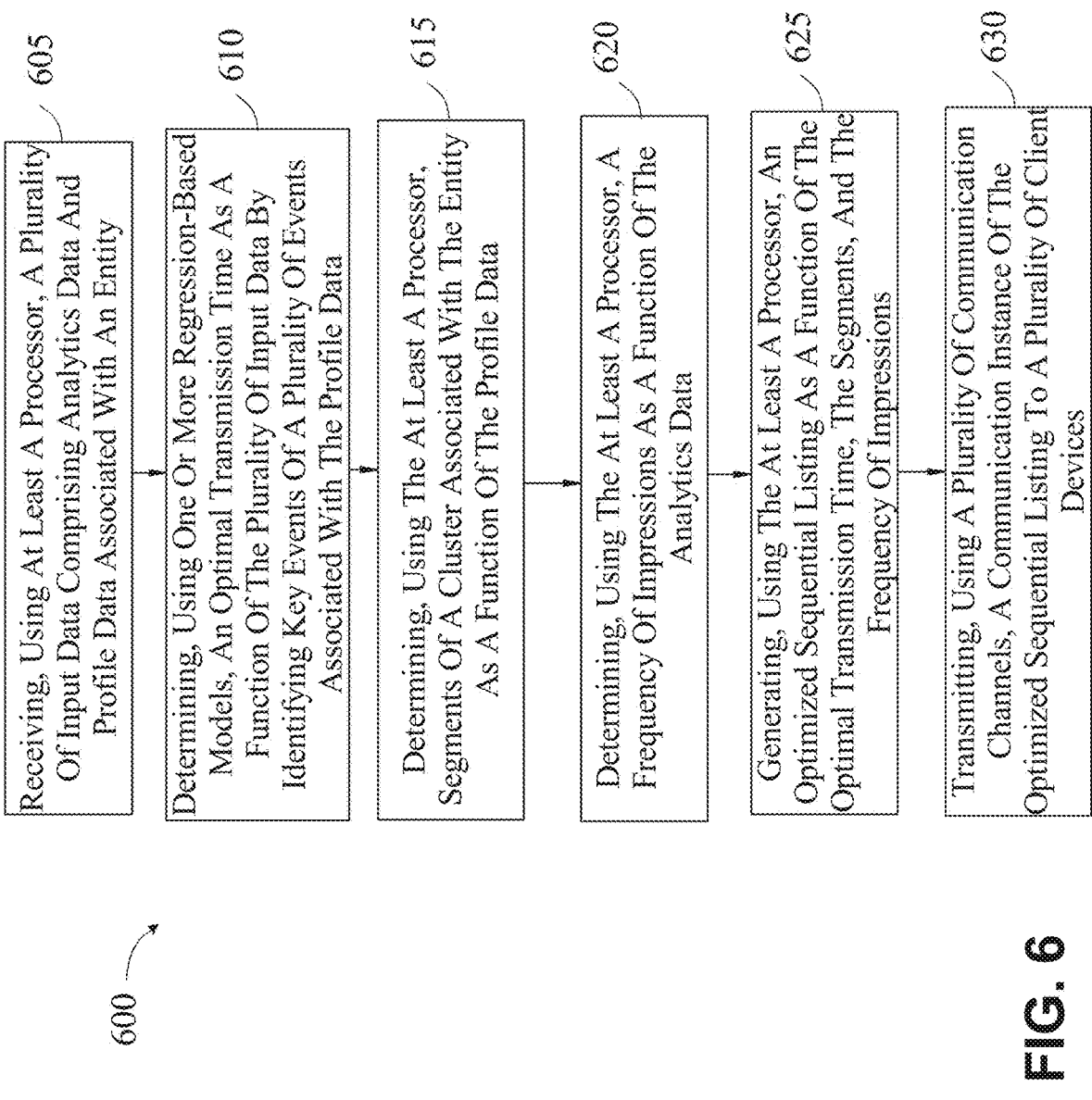

605 — Receiving, Using At Least A Processor, A Plurality Of Input Data Comprising Analytics Data And Profile Data Associated With An Entity 610 — Determining, Using One Or More Regression-Based Models, An Optimal Transmission Time As A Function Of The Plurality Of Input Data By Identifying Key Events Of A Plurality Of Events Associated With The Profile Data 615 — Determining, Using The At Least A Processor, Segments Of A Cluster Associated With The Entity As A Function Of The Profile Data 620 — Determining, Using The At Least A Processor, A Frequency Of Impressions As A Function Of The Analytics Data 625 — Generating, Using The At Least A Processor, An Optimized Sequential Listing As A Function Of The Optimal Transmission Time, The Segments, And The Frequency Of Impressions 630 — Transmitting, Using A Plurality Of Communication Channels, A Communication Instance Of The Optimized Sequential Listing To A Plurality Of Client Devices

Display ~736

724

Storage
Device

728— Medium

720— Instructions

752

Display
Adaptor

732

Input
Device

712

716

Instructions

Processors 704          720

Peripheral
Interface(s)

756

Input/
Output
System

Instructions 708          720

Network
Interface

~740

748— Remote
Device

Network

744

APPARATUS FOR AND METHOD OF GENERATING AN OPTIMIZED SEQUENTIAL LISTING

FIELD OF THE INVENTION

The present invention generally relates to the field of artificial intelligence ("AI") and machine learning leveraged data analytics. In particular, the present invention is directed to an apparatus for and a method of generating an optimized sequential listing.

BACKGROUND

In current digital communication and media delivery environments, conventional systems lack the ability to dynamically coordinate the timing and sequencing of transmitted content based on real-time data relationships. Existing architectures often rely on static scheduling or isolated data processing, which prevents accurate alignment between data-driven signals and transmission events. As a result, these systems experience inefficiencies in determining when and how information should be transmitted across multiple platforms, leading to inconsistencies in timing precision and overall system performance.

SUMMARY OF THE DISCLOSURE

In an aspect, an apparatus for generating an optimized sequential listing includes at least a processor and a memory communicatively connected to the at least a processor. The memory contains instructions configuring the processor to receive a plurality of input data comprising analytics data and profile data associated with an entity, determine, using one or more regression-based models, an optimal transmission time as a function of the plurality of input data by identifying key events of a plurality of events associated with the profile data, determine segments of a cluster associated with the entity as a function of the profile data, determine a frequency of impressions as a function of the analytics data, generate an optimized sequential listing as a function of the optimal transmission time, the segments, and the frequency of impressions, and transmit, using a plurality of communication channels, a communication instance of the optimized sequential listing to a plurality of client devices.

In another aspect, a method of generating an optimized sequential listing for includes receiving, using at least a processor, a plurality of input data comprising analytics data and profile data associated with an entity, determining, using one or more regression-based models, an optimal transmission time as a function of the plurality of input data by identifying key events of a plurality of events associated with the profile data, determining, using the at least a processor, segments of a cluster associated with the entity as a function of the profile data, determining, using the at least a processor, a frequency of impressions as a function of the analytics data, generating, using the at least a processor, an optimized sequential listing as a function of the optimal transmission time, the segments, and the frequency of impressions, and transmitting, using a plurality of communication channels, a communication instance of the optimized sequential listing to a plurality of client devices.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 6 is a block diagram of an exemplary method of generating an optimized sequential listing.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses for and methods of generating an optimized sequential listing. The apparatus includes at least a computing device comprised of a processor and a memory communicatively connected to the processor. The memory instructs the processor to receive a plurality of input data comprising analytics data and profile data associated with an entity. The processor determines, using one or more regression-based models, an optimal transmission time as a function of the plurality of input data by identifying key events of a plurality of events associated with the profile data. The processor determines segments of a cluster associated with the entity as a function of the profile data. Additionally, the processor determines a frequency of impressions as a function of the analytics data. The processor generates an optimized sequential listing as a function of the optimal transmission time, the segments, and the frequency of impressions. The memory then instructs the processor to transmit, using a plurality of communication channels, a communication instance of the optimized sequential listing to a plurality of client devices.

Figure 1:
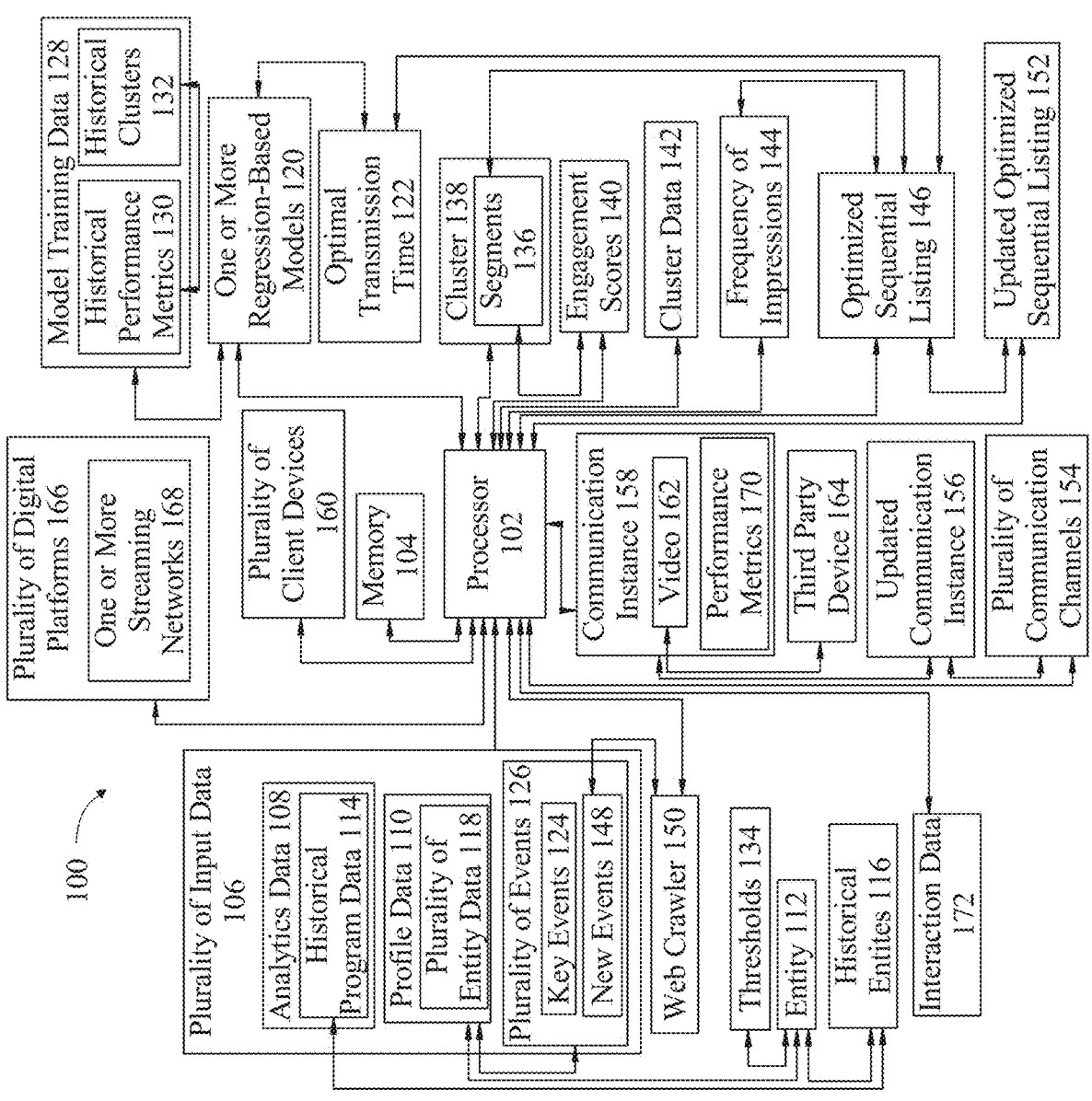
FIG. 1 is a block diagram of an apparatus for generating an optimized sequential listing.

Referring now to FIG. 1, an exemplary embodiment of apparatus 100 for generating an optimized sequential listing is illustrated. Apparatus 100 may include a processor 102 communicatively connected to a memory 104. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 104 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 102 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 102 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 102 may be designed and/or configured to perform any method, method step, or sequence of method steps in any embodiment described in this disclosure, in any order and with any degree of repetition. For instance, processor 102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 102 is configured to receive a plurality of input data 106 comprising analytics data 108 and profile data 110 associated with an entity 112. As used in this disclosure, "input data" is information received by a processor or computational system for analysis, modeling, or processing to generate one or more outputs or operational decisions. In a non-limiting example, input data 106 may include user engagement metrics, regional performance indicators, historical campaign timing logs, and the like. In an embodiment, input data 106 may further include contextual variables such as device type, location data, or media format attributes received from digital platforms 166. Without limitation, input data 106 may be structured or unstructured and may originate from internal databases, third-party analytics tools, live data streams, and the like. As used in this disclosure, "analytics data" is a subset of input data 106 comprising quantitative or qualitative measurements derived from observed behaviors, transactions, or system operations that are used to evaluate performance or identify trends. In a non-limiting example, analytics data 108 may include conversion rates, audience segmentation outcomes, or engagement frequency statistics generated during campaign execution. In an embodiment, analytics data 108 may be calculated using regression models, clustering algorithms, or predictive analysis tools to forecast optimal content deployment. Without limitation, analytics data 108 may reflect time-based trends, cross-channel correlations, or performance benchmarks used to refine marketing strategies.

With continued reference to FIG. 1, as used in this disclosure, "profile data" is descriptive information associated with an entity 112. Without limitation, the descriptive data may include attributes, behaviors, or preferences for use in classification, targeting, or predictive modeling. In a non-limiting example, profile data 110 may include demographic characteristics, prior engagement histories, inferred audience preferences, and the like. In an embodiment, profile data 110 may be stored as part of a dynamic database that updates based on user interactions and response behavior. Without limitation, profile data 110 may include identifiers or behavioral tags that enable personalized content delivery or optimized communication scheduling. As used in this disclosure, an "entity" is any identifiable subject, object, or organization to which data, attributes, or analytics are associated or applied within the system. In a non-limiting example, an entity 112 may include an individual user, a customer segment, or a corporate brand profile managed within a campaign infrastructure. In an embodiment, an entity 112 may further represent a digital channel, such as a video 162 distribution platform or a regional advertising cluster. Without limitation, an entity 112 may be dynamically defined by its role, data relationships, interaction frequency, and the like within the predictive optimization model. In a non-limiting example, processor 102 may receive the plurality of input data 106 through a network interface that enables secure and efficient communication between local devices, remote servers, and cloud-based systems. The processor 102 may operate within a connected computing environment that supports wired and wireless communication technologies, including Ethernet, Wi-Fi, cellular, and satellite transmission protocols. In an embodiment, the processor 102 may continuously receive analytics data 108 and profile data 110 from multiple distributed sources through structured data exchange mechanisms that maintain synchronization and integrity across networked nodes. In another embodiment, the processor 102 may employ application programming interfaces, data pipelines, and message-based communication frameworks to facilitate the transfer of analytics data 108 and profile data 110 from external systems. Such systems may include marketing analytics servers, audience segmentation platforms, content delivery networks, and customer relationship management systems. Data may be formatted using standardized exchange structures such as JavaScript Object Notation, Extensible Markup Language, or delimited text files, enabling compatibility and uniform interpretation across heterogeneous platforms. Without limitation, secure transmission protocols such as Transport Layer Security, Hypertext Transfer Protocol Secure, and Virtual Private Network tunneling may be implemented to protect data during transfer. The processor 102 may further utilize communication components such as gateways, proxies, and load balancers to manage data flow and optimize throughput. In some embodiments, input data 106 may be received in real time through streaming data channels, while in other configurations, data may be received in scheduled intervals for bulk processing. This arrangement may allow processor 102 to continuously integrate analytics data 108 and profile data 110 associated with each entity 112 into a cohesive dataset for predictive modeling and strategic campaign optimization.

With continued reference to FIG. 1, the analytics data 108 may include historical program data 114 associated with historical entities 116 and wherein the profile data 110 comprises a plurality of entity data 118. As used in this disclosure, "historical program data" is data representing past performance, operation, or outcome metrics of one or more programs, campaigns, or system executions stored for retrospective analysis or modeling. In a non-limiting example, historical program data 114 may include archived campaign schedules, audience reach statistics, conversion outcomes, and the like collected from prior marketing launches. In an embodiment, historical program data 114 may be maintained within a centralized analytics database to enable trend analysis, performance benchmarking, or predictive modeling. Without limitation, historical program data 114 may include multi-period records that inform future campaign timing, audience segmentation, content distribution strategies, and the like. In a non-limiting example, historical program data 114 may include information collected from a prior media distribution sequence in which multiple video 162 assets were released across digital platforms 166 over a defined period. The stored data may comprise transmission timestamps, view completion percentages, playback duration statistics, and geographic engagement variations corresponding to each previously distributed video 162. In an embodiment, processor 102 may access this historical program data 114 from a centralized analytics repository to identify patterns such as peak viewing intervals or regional performance trends. Without limitation, the retrieved historical program data 114 may then be used to compare past outcomes across multiple entities, such as previous content providers or publishing systems, to support model training and predictive analysis for subsequent scheduling operations. In a non-limiting example, historical program data 114 may include a detailed record of a prior content release sequence conducted by a streaming service that distributed a series of promotional videos 162 for multiple entities across several regions. The data may contain transmission logs identifying the exact time each video 162 was published, corresponding audience view counts per hour, playback completion percentages, and interaction data 172 such as pause frequency, rewind activity, and average engagement duration. In an embodiment, the data may further include metadata indicating which devices were used for playback, network quality metrics affecting stream stability, and regional engagement variations that influenced audience retention. Processor 102 may retrieve this historical program data 114 from a centralized analytics database and analyze it to determine which time intervals, device categories, or content formats historically yielded the highest audience participation for each entity. Without limitation, these findings may then form the basis for constructing predictive models that anticipate optimal scheduling patterns and inform future sequencing decisions across multiple digital platforms 166 and communication channels 154.

With continued reference to FIG. 1, as used in this disclosure, "historical entities" are previously executed programs or campaigns for which performance data, operational attributes, or analytical results have been generated and stored within the system. In a non-limiting example, historical entities 116 may include prior broadcast schedules, digital release sequences, archived campaign executions represented within historical datasets, and the like. In an embodiment, historical entities 116 may be referenced to evaluate variations in audience response, delivery timing, predictive model accuracy across different operational periods, and the like. Without limitation, historical entities 116 may function as comparative baselines for assessing the performance and scheduling effectiveness of current or future program campaigns within an iterative optimization framework. As used in this disclosure, "entity data" is a collection of attributes, identifiers, and descriptive information corresponding to a specific program campaign that is used for characterization, classification, or predictive modeling within the system. In a non-limiting example, entity data 118 may include details such as program duration, target audience characteristics, release region, historical engagement levels, and content category identifiers. In an embodiment, entity data 118 may include both static descriptors, such as program type or release medium, and dynamic parameters, such as real-time audience response rates or evolving transmission performance indicators. Without limitation, entity data 118 may be utilized by processor 102 to generate predictive performance profiles, refine scheduling parameters, and optimize the transmission strategy associated with each program campaign.

Still referring to FIG. 1, processor 102 is configured to determine, using one or more regression-based models 120, an optimal transmission time 122 as a function of the plurality of input data 106 by identifying key events 124 of a plurality of events 126 associated with the profile data 110. As used in this disclosure, a "regression-based model" is a computational framework configured to identify relationships between dependent and independent variables to predict or estimate outcomes based on observed data. In a non-limiting example, a regression-based model 120 may utilize historical performance data, audience behavior metrics, engagement frequency, and the like to forecast campaign effectiveness. In an embodiment, the regression-based model 120 may apply linear, logistic, polynomial regression techniques, and the like to determine correlations between input parameters and resulting audience responses. Without limitation, a regression-based model 120 may be employed by processor 102 to compute probability-weighted predictions for content scheduling, message delivery, or distribution timing. As used in this disclosure, "optimal transmission time" is the calculated or predicted temporal point at which content delivery, message distribution, and/or campaign deployment is expected to yield maximum engagement or efficiency based on analytical modeling. In a non-limiting example, the optimal transmission time 122 may correspond to the hour, day, or week when target audiences are statistically most active or responsive. In an embodiment, the determination of the optimal transmission time 122 may account for geographic distribution, user behavior patterns, and historical response intervals. Without limitation, the optimal transmission time 122 may vary dynamically across campaigns, entities, or delivery channels depending on evolving data patterns detected by the processor 102. In a non-limiting example, processor 102 may determine an optimal transmission time 122 for a program campaign promoting a new video 162 series scheduled for release across multiple streaming networks 168. The processor 102 may analyze historical program data 114 that includes prior release times, audience viewership peaks, and engagement duration across various regions. For instance, the analysis may reveal that audiences in North America exhibit the highest streaming activity between 7:00 p.m. and 9:00 p.m. local time on Thursdays, while audiences in Europe are most active on Saturday afternoons. In an embodiment, processor 102 may apply regression-based modeling to correlate these engagement patterns with demographic and device usage data to predict when the next program campaign should be transmitted for maximum viewership. Without limitation, the system may then automatically schedule the transmission of the campaign materials, such as video 162 advertisements, promotional trailers, or announcements, at the calculated optimal transmission times 122 for each geographic segment, thereby increasing overall exposure efficiency and viewer engagement.

With continued reference to FIG. 1, as used in this disclosure, "key events" are significant real-world occurrences or temporal milestones that exert measurable influence on the performance, timing, or predictive outcomes of a program campaign. In a non-limiting example, key events 124 may include the release of a related product, a major industry announcement, a cultural or sporting event, or a public holiday that alters audience engagement patterns. In an embodiment, processor 102 may identify key events 124 by analyzing correlations between historical campaign performance data and external event timelines to determine when such occurrences have previously impacted audience responsiveness. Without limitation, the identification of key events 124 allows the processor 102 to align or adjust campaign scheduling around these influential external factors to enhance timing precision and overall program performance. As used in this disclosure, "measurable influence" is an observable and quantifiable effect or impact that one variable, condition, or event exerts on another within a defined analytical framework. In a non-limiting example, measurable influence may refer to a statistically detectable change in audience engagement, response rate, or performance metric that occurs as a result of a specific external event or system action. In an embodiment, measurable influence may be determined through computational analysis, such as correlation assessment, regression modeling, or temporal comparison, to identify how strongly an event or condition affects a given outcome. Without limitation, measurable influence provides an objective basis for evaluating causal or predictive relationships within the data processed by the system. In a non-limiting example, processor 102 may detect a measurable influence when a global sporting event causes a temporary reduction in audience engagement for a scheduled program campaign. The system may analyze analytics data 108 showing that viewership rates decline by a quantifiable percentage during the hours surrounding the live broadcast of the sporting event compared to normal engagement levels. In an embodiment, this measurable influence may be expressed as a statistical correlation between the timing of the external event and the observed drop in audience interaction metrics. Without limitation, processor 102 may record the degree of this influence as a variable within its predictive modeling framework, allowing future campaign transmissions to be scheduled at alternate times to avoid similar declines in engagement. As used in this disclosure, an "event" is any identifiable real-world occurrence, condition, or temporal marker. Without limitation, the event may have the potential to affect audience behavior, system operation, campaign outcomes, and the like. In a non-limiting example, events 126 may include global news developments, weather changes, competitive releases, industry-specific activities, and the like that influence audience attention or availability. In an embodiment, events 126 may be detected, tracked, or aggregated through external data feeds, web crawlers, or integrated scheduling systems to provide contextual awareness within the analytics framework. Without limitation, events 126 form the broader dataset from which key events 124 are identified, enabling processor 102 to incorporate external situational awareness into predictive modeling and campaign optimization processes.

With continued reference to FIG. 1, in a non-limiting example, processor 102 may determine an optimal transmission time 122 for a program campaign by analyzing historical and real-time data to identify key events 124 that are likely to influence audience engagement. For instance, if the processor 102 detects that a major entertainment awards ceremony or a sports championship final is scheduled within the same time window as the planned program release, it may classify these occurrences as key events 124 that exert measurable influence on viewership behavior. In an embodiment, the regression-based model 120 may correlate historical performance drops during similar events 126 with audience engagement data to predict a reduced response if the program were transmitted concurrently. In another non-limiting example, the processor 102 may identify product release dates, seasonal promotions, or industry conferences as key events 124 that historically increase audience activity within specific market segments. The regression-based model 120 may analyze patterns showing that audience interaction spikes during these periods, indicating a more favorable transmission window. Without limitation, processor 102 may then calculate the optimal transmission time 122 by aligning the program campaign's release schedule with these high-engagement intervals while avoiding periods of audience distraction caused by competing events 126 or lower activity cycles. In another embodiment, the processor 102 may continuously update its key event dataset through web crawlers or external data feeds that track global occurrences such as holidays, media premieres, or breaking news. This enables the regression-based model 120 to dynamically adjust the optimal transmission time 122 for each campaign in real time, ensuring that scheduling decisions remain responsive to changing event landscapes and audience behavior patterns. In a non-limiting example, the apparatus 100 may obtain key event 124 information through automated data acquisition systems configured to monitor and collect event-related data from multiple internal and external sources. In an embodiment, processor 102 may utilize a web crawler 150 to continuously scan structured and unstructured online sources such as news outlets, event calendars, media databases, and public scheduling feeds to detect relevant occurrences that may influence program campaign performance. The web crawler 150 may extract event metadata including event titles, categories, timestamps, and geographic relevance, which are then stored within a system-accessible event repository. In an embodiment, the apparatus 100 may integrate with third-party application programming interfaces that provide real-time event data such as entertainment releases, sports schedules, or global news developments. These data streams may be filtered and standardized by the processor 102 to match the format of the system's analytics database. Without limitation, the apparatus 100 may further utilize internal data feeds from organizational systems, such as product launch calendars or regional broadcast schedules, to identify events 126 specific to the operational environment of the campaign. In a non-limiting example, the apparatus 100 may analyze and validate collected event information by comparing it against historical campaign performance data to determine whether a newly detected occurrence qualifies as a key event 124. The processor 102 may apply temporal correlation analysis to identify which events 126 historically coincided with measurable changes in audience activity or engagement metrics. Without limitation, this configuration may allow the apparatus 100 to autonomously obtain, evaluate, and update key event 124 information in real time, ensuring that predictive scheduling and optimization remain aligned with current and forthcoming real-world conditions.

With continued reference to FIG. 1, the at least a processor 102 may be further configured to train the one or more regression-based models 120 using model training data 128, wherein the model training data 128 comprises historical performance metrics 130 associated with historical clusters 132. As used in this disclosure, "historical clusters" are groups or subsets of entities, data points, or behavioral profiles that have been generated, stored, or derived from prior datasets or previous system iterations to represent past conditions, trends, or performance patterns. In a non-limiting example, historical clusters 132 may correspond to archived audience segments 138 reflecting user behavior during a specific campaign period, legacy product cycle, or earlier market conditions. In an embodiment, historical clusters 132 may serve as a temporal benchmark against which current or real-time clusters are compared, thereby enabling performance drift analysis, behavioral evolution tracking, or predictive recalibration. Accordingly, the distinction between "clusters" and "historical clusters" lies primarily in temporal and analytical context. Clusters 138 may represent dynamically generated groupings based on current or active data inputs, while historical clusters 132 may represent previously established groupings used for retrospective comparison or model validation over time. As used in this disclosure, "model training data" is a structured dataset utilized to develop, calibrate, or refine one or more computational or statistical models by enabling the model to learn patterns, correlations, or predictive relationships among variables. In a non-limiting example, model training data 128 may include annotated datasets representing prior campaign outcomes, engagement behaviors, and transmission times used to establish regression coefficients or weighting factors. In an embodiment, model training data 128 may be continuously updated to reflect new analytics inputs, thereby improving model accuracy and adaptability over time. Without limitation, model training data 128 may serve as the foundational reference set that informs the predictive capability of regression-based models 120 implemented by processor 102. As used in this disclosure, "historical performance metrics" are quantifiable indicators derived from prior program or campaign activities that measure effectiveness, efficiency, or audience response across defined time intervals. In a non-limiting example, historical performance metrics 130 may include click-through rates, conversion ratios, engagement duration, return on ad spend recorded from previous deployments, and the like. As used in this disclosure, "click-through rates" are quantitative measures representing the ratio of the number of users who click on a displayed link, advertisement, or interactive element to the total number of users who viewed the content. The click-through rates may be expressed as a percentage. In a non-limiting example, click-through rates may indicate the relative effectiveness of a transmitted communication instance 158 in prompting user interaction within a digital platform 166. In an embodiment, click-through rates may be logged and analyzed by the processor 102 to assess message relevance, call-to-action efficiency, and overall engagement strength. As used in this disclosure, "conversion ratios" are proportional values that represent the number of successful desired actions divided by the total number of interactions or impressions generated by a communication instance 158. Without limitation, the desired actions may include purchases, sign-ups, content completions, and the like. In a non-limiting example, conversion ratios may indicate how efficiently a program campaign transforms audience engagement into defined outcomes. In an embodiment, conversion ratios may be stored as part of historical performance metrics 130 to evaluate content effectiveness and inform future predictive modeling. As used in this disclosure, "engagement duration" is the measurable length of time a user interacts with or remains active within a communication instance 158, media presentation, or digital platform 166 during a defined period. In a non-limiting example, engagement duration may include the average watch time of a video 162, the time spent scrolling through interactive content, or the duration of session activity following a transmission. In an embodiment, engagement duration may be analyzed by the processor 102 to identify optimal content lengths, delivery intervals, and timing conditions associated with sustained audience attention. As used in this disclosure, "return on ad spend" is a financial performance metric representing the ratio of revenue or measurable value generated from an advertising or promotional effort to the total cost of that effort. In a non-limiting example, return on ad spend may quantify the overall efficiency of a prior program campaign by comparing income or conversion value against campaign expenditure. In an embodiment, return on ad spend may be incorporated into historical program data 114 to support regression-based model training, allowing the processor 102 to identify patterns between expenditure levels, scheduling decisions, and resulting audience or financial outcomes. In an embodiment, such metrics may be aggregated, normalized, and compared across campaigns to identify trends or patterns that influence predictive modeling. Without limitation, historical performance metrics 130 may serve as both evaluative benchmarks and input parameters for regression-based model training and optimization.

With continued reference to FIG. 1, as used in this disclosure, "clusters" are groups or subsets of entities, data points, or behavioral profiles that share statistically significant similarities based on selected attributes or performance characteristics. In a non-limiting example, clusters may represent audience segments 136 grouped by demographic similarity, engagement frequency, or regional interaction trends. In an embodiment, clustering may be achieved through machine learning algorithms such as k-means, hierarchical grouping, or density-based spatial analysis to organize data for more accurate predictive computation. Without limitation, clusters may enable the processor 102 to tailor regression-based modeling to distinct audience categories, thereby enhancing the precision of campaign forecasting and optimization. In a non-limiting example, processor 102 may perform model training by analyzing model training data 128 comprising historical performance metrics 130 that are categorized according to defined clusters of entities or audience segments 136. During this process, the processor 102 may identify statistical relationships between input variables, such as engagement frequency, transmission timing, and content type, and corresponding outcome variables, including conversion rates or audience retention. In an embodiment, the training process may involve computing regression coefficients that minimize predictive error across data samples, thereby refining the model's ability to estimate optimal transmission parameters for future campaigns. In another embodiment, the processor 102 may iteratively process historical performance metrics 130 associated with each cluster 138 to establish cluster-specific behavioral patterns. These patterns may then be used to calibrate regression-based models 120 that account for intra-cluster variability, allowing the model to adapt predictions to different audience types or operational contexts. The processor 102 may further partition model training data 128 into training and validation sets, enabling continuous assessment of model accuracy and preventing overfitting to historical records. Without limitation, the training process may be implemented through supervised learning frameworks where known outcomes from historical campaigns are used to guide model parameter adjustments. The processor 102 may employ optimization techniques such as gradient descent, regularization, cross-validation, and the like to enhance model generalization. As used in this disclosure, "gradient descent" is an iterative optimization technique used to minimize the error or loss function of a model by adjusting its parameters in the direction of the steepest decrease in error based on the computed gradient. In a non-limiting example, gradient descent may be employed by the processor 102 to refine the coefficients of a regression-based model 120 until the predicted outcomes align closely with the actual data observed in the model training set. In an embodiment, the processor 102 may implement variations of gradient descent such as batch, stochastic, or mini-batch gradient descent to improve convergence efficiency and stability during model training. As used in this disclosure, "regularization" is a mathematical process applied during model training to prevent overfitting by introducing a penalty term that limits the magnitude or complexity of the model parameters. In a non-limiting example, regularization may constrain regression coefficients or model weights to avoid excessive sensitivity to noise or outliers in the training data. In an embodiment, the processor 102 may apply regularization methods such as L1 or L2 normalization to maintain model balance, stability, and generalization when predicting new or unseen data. As used in this disclosure, "cross-validation" is a model evaluation technique in which the available dataset is divided into multiple subsets, allowing the model to be trained on one portion and validated on another to assess predictive performance and robustness. In a non-limiting example, cross-validation may enable the processor 102 to measure how well a regression-based model 120 generalizes to independent data and to detect potential bias or overfitting. In an embodiment, the processor 102 may implement k-fold cross-validation, leave-one-out validation, or similar partitioning strategies to ensure comprehensive performance testing across all portions of the model training data 128. In some embodiments, the training process may be executed periodically or dynamically as new performance data becomes available, ensuring that regression-based models 120 remain responsive to evolving audience behaviors and content performance trends. This configuration may allow processor 102 to generate increasingly precise predictions for campaign scheduling, message delivery timing, and overall optimization strategy.

With continued reference to FIG. 1, the at least a processor 102 may be further configured to filter the plurality of events 126 based on thresholds 134 associated with the entity 112. As used in this disclosure, a "threshold" is a defined quantitative or qualitative limit, boundary, or condition used by a processor 102 to determine whether specific data, events 126, or metrics meet criteria for further analysis, inclusion, or response. In a non-limiting example, processor 102 may utilize thresholds 134 to evaluate whether individual events 126 within a dataset meet minimum engagement, frequency, or relevance requirements before being considered in subsequent predictive computations. In an embodiment, thresholds 134 may be dynamically determined based on entity-specific characteristics such as activity level, audience size, or historical interaction rate. Without limitation, thresholds 134 may be expressed as numerical values, percentage ranges, categorical conditions, and the like that distinguish significant events 126 from background or low-impact data. In a non-limiting example, the processor 102 may filter events 126 associated with an entity 112 by applying engagement-based thresholds 134, such as excluding events 126 with view durations shorter than a predetermined minimum time or click rates below a target percentage. In an embodiment, if an entity's profile indicates historically high engagement performance, the processor 102 may raise the threshold 134 to focus on only the most meaningful events 126, such as high-value conversions or premium content interactions. Without limitation, thresholds 134 may be applied temporally, such as disregarding events 126 occurring outside active campaign windows, or contextually, such as filtering out low-priority interactions detected during low-traffic periods. This configuration may enable processor 102 to refine the dataset by isolating only those events 126 that demonstrate statistically relevant or operationally significant behavior relative to the entity's performance profile. As a result, the apparatus 100 may enhance modeling precision, reduces noise in the analytical dataset, and ensures that predictive outputs, such as timing recommendations or audience forecasts, are based on high-quality, contextually weighted event data.

Still referring to FIG. 1, processor 102 is configured to determine segments 136 of a cluster 138 associated with the entity 112 as a function of the profile data 110. As used in this disclosure, "segments" are defined groups or subsets within a cluster 138 that share common attributes, behaviors, or characteristics derived from profile data 110, enabling more precise targeting, analysis, or optimization. In a non-limiting example, processor 102 may determine segments 136 of a cluster 138 associated with an entity 112 by analyzing profile data 110 to identify patterns or similarities among entities based on demographics, geographic regions, or behavioral attributes. In an embodiment, segments 136 may be defined using statistical methods or computational classification models that group audience members according to engagement frequency, content preferences, or interaction timing. Without limitation, segments 136 May represent actionable subgroups such as high-value customers, frequent viewers, or early adopters, each associated with distinct predictive behaviors or response probabilities. In a non-limiting example, processor 102 may analyze the profile data 110 of an entity's audience cluster 138 to create targeted segments 136 for campaign optimization. The apparatus 100 may separate the cluster 138 into smaller segments 136 such as new users, returning users, and inactive users, each requiring different messaging strategies and transmission schedules. As used in this disclosure, a "transmission schedule" is a structured timetable or ordered sequence that defines when and how often a communication instance 158, media asset, or program campaign is delivered across one or more communication channels 154. In a non-limiting example, a transmission schedule may specify exact timestamps, frequency intervals, and platform designations for distributing content to different audience segments 136 or client devices 160. In an embodiment, the transmission schedule may be dynamically controlled by the processor 102, which analyzes analytics data 108 to determine whether to accelerate or delay transmissions based on engagement rates, audience activity patterns, or real-time performance feedback. Without limitation, the transmission schedule may operate as an adaptive framework that continuously aligns delivery timing and repetition frequency with predictive insights derived from regression-based models 120, ensuring that content dissemination occurs at the most effective and responsive intervals. In an embodiment, the processor 102 may evaluate attributes such as age range, regional location, content engagement levels, and purchasing trends to assign entities to specific segments 136. Without limitation, the segmentation process may allow the apparatus 100 to deliver customized communications, refine timing predictions, and improve the overall performance of campaign strategies by aligning each segment with its corresponding behavioral profile.

With continued reference to FIG. 1, the at least a processor 102 may be further configured to predict engagement scores 140 for the segments 136 of the cluster 138 as a function of cluster data 142. As used in this disclosure, "engagement scores" are quantitative values that represent predicted or measured levels of interaction, participation, or responsiveness of entities or audience segments 136 with respect to specific content, campaigns, or communications. In a non-limiting example, processor 102 may be configured to predict engagement scores 140 for segments 136 of a cluster 138 by analyzing cluster data 142 that includes historical interaction metrics, behavioral attributes, and performance patterns, and the like associated with each segment. In an embodiment, the processor 102 may apply regression-based or machine learning models that evaluate correlations between input variables such as view duration, click frequency, content type, and prior response history to generate a numerical engagement score 140. Without limitation, engagement scores 140 may be normalized or weighted according to factors such as recency of activity, frequency of participation, or relative importance of specific interaction types. In a non-limiting example, processor 102 may compute engagement scores 140 by processing both historical and real-time cluster data 142 to predict how strongly each segment is likely to interact with future campaigns. The apparatus 100 may analyze behavioral variables such as average viewing time, conversion rate, or media completion rate to quantify engagement potential. In an embodiment, engagement scores 140 may be dynamically updated as new interaction data 172 is received, enabling the processor 102 to continually refine predictive accuracy and adapt to changing audience behaviors. Without limitation, the engagement scores 140 may then be used to prioritize transmission timing, tailor content delivery, and allocate resources toward the most responsive segments 136, thereby improving overall campaign performance and predictive model precision. In a non-limiting example, processor 102 may improve engagement scoring by incorporating multiple behavioral variables that extend beyond basic performance metrics 170 such as average viewing time, conversion rate, or media completion rate. The processor 102 may analyze patterns across a broader range of factors, including session frequency, dwell time between content interactions, re-engagement intervals, and cross-platform activity correlations. In an embodiment, these behavioral inputs may be weighted within a regression-based or machine learning framework, allowing the system to determine which variables exert the greatest measurable influence on engagement outcomes. In an embodiment, the processor 102 may further enhance predictive precision by dynamically recalibrating engagement scores 140 as new interaction data 172 is received from multiple digital platforms 166, streaming networks 168, or client devices 160. Each new dataset may trigger an adaptive update cycle, during which the system evaluates recent engagement behavior against historical performance trends to identify deviations or emerging audience patterns. The model parameters may then be automatically adjusted using optimization techniques such as gradient descent and cross-validation, ensuring that engagement predictions remain accurate and reflective of current audience dynamics. Without limitation, the continually refined engagement scores 140 may be applied to optimize system operations across several dimensions. The processor 102 may use the updated scores to prioritize which audience segments 136 receive transmissions first, schedule delivery at time intervals aligned with peak engagement likelihood, and determine which content formats or media lengths yield the highest responsiveness. In an additional embodiment, engagement scores 140 may also guide adaptive resource allocation, enabling the system to focus computational, bandwidth, or promotional resources on the most active or high-value audience segments 136. This iterative process improves not only campaign performance but also the precision, efficiency, and responsiveness of the predictive modeling framework over time.

Still referring to FIG. 1, processor 102 is configured to determine a frequency of impressions 144 as a function of the analytics data 108. As used in this disclosure, "frequency of impressions" is the measured or calculated number of times a specific content item, advertisement, or communication is displayed to a given entity or audience segment within a defined time period. In a non-limiting example, processor 102 may determine the frequency of impressions 144 as a function of the analytics data 108 by analyzing historical and real-time performance indicators that record how often an entity 112 has been exposed to a particular message or campaign asset. In an embodiment, the processor 102 may utilize engagement logs, impression counters, or view tracking systems to quantify exposure frequency across multiple delivery channels such as streaming platforms, social media, or digital advertising networks. Without limitation, the processor 102 may apply statistical or regression-based analysis to identify the optimal frequency range that maximizes audience response without causing oversaturation or diminishing engagement efficiency. In a non-limiting example, processor 102 may evaluate impression frequency to ensure that campaign delivery remains balanced between sufficient exposure and audience fatigue. The apparatus 100 may adjust transmission schedules dynamically, increasing or reducing delivery intervals based on observed engagement rates within the analytics data 108. In an embodiment, frequency of impressions 144 may be used to compare performance across different audience segments 136, determining which groups respond more effectively to higher or lower repetition levels. Without limitation, this analysis allows the processor 102 to fine-tune campaign delivery strategies, optimize media allocation, and enhance overall engagement outcomes by aligning impression frequency with predictive audience responsiveness.

Still referring to FIG. 1, processor 102 is configured to generate an optimized sequential listing 146 as a function of the optimal transmission time 122, the segments 136, and the frequency of impressions 144. As used in this disclosure, an "optimized sequential listing" is an ordered arrangement of transmission or delivery events that has been computationally structured to maximize performance outcomes based on predictive parameters such as timing, segmentation, and exposure frequency. In a non-limiting example, processor 102 may generate an optimized sequential listing 146 as a function of the optimal transmission time 122, the segments 136, and the frequency of impressions 144 to create a precisely ordered campaign schedule. In an embodiment, the processor 102 may integrate predictive outputs from regression-based models 120 to determine the ideal sequence in which content items or communications should be delivered to each segment of a cluster 138. The ordering may account for factors including audience availability, engagement probability, and prior exposure levels to ensure that each message reaches its intended audience at the most effective time and frequency. As used in this disclosure, "audience availability" is a temporal and contextual measure representing the periods during which a target audience or segment is most likely to be accessible, active, or capable of receiving transmitted content through one or more communication channels 154. In a non-limiting example, audience availability may be determined by analyzing historical login patterns, device activity timestamps, or regional time zones associated with prior viewership data. In an embodiment, processor 102 may utilize audience availability to schedule transmissions during periods of peak audience presence, thereby increasing message visibility and response likelihood. As used in this disclosure, "engagement probability" is a predictive value representing the likelihood that a member of an audience or segment will interact with, respond to, or take a measurable action in relation to a transmitted communication instance 158. In a non-limiting example, engagement probability may be computed by evaluating prior behavioral trends, content preferences, and historical engagement metrics within the analytics data 108. In an embodiment, processor 102 may use engagement probability to prioritize transmission timing or content sequencing, ensuring that delivery occurs when audience responsiveness is statistically highest. As used in this disclosure, "prior exposure levels" are quantitative indicators describing the frequency or intensity with which an audience member or segment has previously encountered a particular communication instance 158, message, or content item. In a non-limiting example, prior exposure levels may include the number of impressions, repeated views, or cumulative watch time associated with an individual or segment. In an embodiment, processor 102 may analyze prior exposure levels to prevent overexposure, manage repetition frequency, and maintain audience receptivity by adjusting the transmission schedule or optimizing message rotation accordingly. Without limitation, the optimized sequential listing 146 may be dynamically updated as new analytics data becomes available, allowing the system to continuously refine its scheduling logic and performance accuracy. In a non-limiting example, the optimized sequential listing 146 may take the form of a time-stamped schedule that aligns each segment's transmission window with its predicted engagement peak. The processor 102 may assign higher-priority content to earlier positions in the sequence for highly responsive segments 136, while deferring lower-priority communications to later intervals to prevent overexposure. In a non-limiting example, processor 102 may obtain and process audience availability, engagement probability, and prior exposure level data through an integrated technological architecture that connects client devices 160, digital platforms 166, and analytics systems in a continuous feedback loop. The process may combine data collection mechanisms, communication protocols, and predictive computation within a unified control environment that allows real-time adaptation to audience behavior. In an embodiment, audience availability data may be gathered using embedded tracking modules deployed across streaming platforms, websites, or mobile applications. In a non-limiting example, embedded tracking modules may include software components or scripts integrated within digital platforms 166, websites, mobile applications, or media players that record and transmit user interaction data 172 to the processor 102. These modules are designed to operate in the background of user interfaces, monitoring defined behaviors such as viewing activity, click actions, playback events, and session duration. The embedded modules may collect data in real time and communicate it to centralized analytics systems through secure data transmission protocols. In an embodiment, one type of embedded tracking module may include JavaScript-based tracking scripts that are integrated into web pages or digital advertisements. These scripts can detect when a user views or clicks on a content element and transmit that information as structured data packets to the processor 102 through Hypertext Transfer Protocol Secure. Another type of tracking module may include software development kits incorporated into mobile or smart television applications. These kits may record data such as application launch times, playback progress, or device type and transmit those metrics via WebSocket or Representational State Transfer-based communication. In an embodiment, embedded tracking modules may also take the form of tracking pixels or transparent image tags embedded within media content. When the content is viewed or loaded, the tracking pixel triggers a server request that logs event-specific data such as timestamp, content identifier, and device location. Without limitation, embedded tracking modules may be used by the processor 102 to collect detailed audience activity data across multiple platforms. This data may then be stored in analytics databases and used to update audience availability records, measure engagement probability, and monitor exposure frequency, allowing the apparatus 100 to dynamically adjust transmission schedules and optimize content delivery timing. These modules may record timestamps corresponding to when a user launches an application, views a program, or interacts with a media element. Each recorded event may be transmitted to the processor 102 through secure network protocols such as Hypertext Transfer Protocol Secure or WebSocket communication, ensuring encrypted and efficient data transfer. Once received, the processor 102 may organize this data into time-based patterns using time-series databases that store recurring audience activity across defined periods. The processor 102 may then analyze these temporal trends to identify predictive windows indicating when specific audience segments 136 are most active. In an embodiment, engagement probability may be determined by combining data analysis and machine learning methods. The processor 102 may evaluate existing analytics variables such as click-through rates, engagement duration, and conversion ratios to identify correlations between audience behaviors and content responsiveness. Using computational frameworks such as TensorFlow or PyTorch, the processor 102 may develop regression-based or probabilistic models that estimate the likelihood of audience interaction with upcoming transmissions. As new engagement data is collected, the processor 102 may automatically adjust model parameters to maintain accuracy and account for evolving audience patterns. Prior exposure levels may be obtained through direct data exchange with media systems, including streaming networks 168, advertising servers, and content distribution infrastructures. Each transmission instance may generate a record containing details such as the time of exposure, content identifier, and viewing device. The processor 102 may aggregate these exposure records into a unified dataset that reflects how many times each audience segment has encountered a particular communication instance 158. If the processor 102 determines that a segment has reached a high exposure level, it may reduce the frequency of subsequent transmissions or alter the order within the optimized sequential listing 146 to prevent overexposure. Without limitation, the apparatus 100 may utilize cloud-based computing environments, distributed databases, and real-time event processing frameworks to manage the continuous influx of behavioral data. The system may implement synchronization protocols to ensure that audience availability, engagement probability, and exposure level datasets remain current and consistent across multiple digital platforms 166. Through this architecture, processor 102 may transform behavioral signals into predictive intelligence that enables dynamic scheduling, adaptive prioritization, and sustained optimization of audience engagement. In an embodiment, the optimized sequential listing 146 may include optimized schedules that dictate when and how often each message is displayed across multiple digital platforms 166. Without limitation, this configuration may enable coordinated multi-channel delivery, ensuring that campaign events occur in a strategically optimized order that enhances audience reach, improves engagement consistency, and strengthens overall campaign performance.

With continued reference to FIG. 1, the at least a processor 102 may be further configured to aggregate, using a web crawler 150, new events 148 of the plurality of events 126, generate an updated optimized sequential listing 152 as a function of the new events 148, and transmit, using the plurality of communication channels 154, an updated communication instance 156 of the updated optimized sequential listing 152. As used in this disclosure, a "web crawler" is an automated computational process configured to systematically search, retrieve, and aggregate data from online sources or networked environments for analysis or model updating. As used in this disclosure, "new events" are recently detected or recorded actions, occurrences, or data points associated with entities that were not previously included in the plurality of events 126 used for prior analysis or optimization. As used in this disclosure, an "updated optimized sequential listing" is a revised or regenerated version of a previously established optimized sequential listing that incorporates newly aggregated data, including new events 148, to reflect current performance conditions and predictive model outputs. As used in this disclosure, a "communication channel" is a defined medium or pathway through which messages, content, or campaign materials are transmitted to entities or audience segments 136. As used in this disclosure, a "communication instance" is a specific occurrence or execution of content transmission, delivery, or messaging through one or more communication channels 154 based on the optimized sequential listing 146. In a non-limiting example, processor 102 may employ a web crawler 150 to continuously monitor and collect new events 148 from various digital environments, including web pages, content management systems, or connected analytics platforms. In an embodiment, these new events 148 may include user interactions such as content views, link clicks, form submissions, or other measurable engagements that indicate recent audience behavior. The web crawler 150 may periodically aggregate this information and supply it to the processor 102 for analysis and integration into existing datasets. In an embodiment, upon aggregation of new events 148, the processor 102 may generate an updated optimized sequential listing 152 by recalculating predictive parameters such as optimal transmission time 122, audience segment responsiveness, impression frequency, and the like. This process may ensure that campaign scheduling remains aligned with the most recent audience activity and behavioral trends. Without limitation, the updated optimized sequential listing 152 may include refined schedules that adjust message timing or order to reflect changes in engagement likelihood or communication priorities. In a non-limiting example, the processor 102 may then transmit an updated communication instance 156 through multiple communication channels 154 such as email, social media networks, streaming platforms, or digital advertising exchanges. The updated communication instance 156 represents the current version of the optimized campaign delivery plan, implemented according to the recalculated listing. Without limitation, this configuration enables real-time adaptability of marketing operations, allowing campaigns to evolve automatically as new events 148 are detected, thereby maintaining consistent alignment between audience activity, message timing, and communication strategy.

Still referring to FIG. 1, processor 102 is configured to transmit, using a plurality of communication channels 154, a communication instance 158 of the optimized sequential listing 146 to a plurality of client devices 160. As used in this disclosure, a "client device" is an electronic computing apparatus 100 operated by or associated with an end user, entity, or recipient that is configured to receive, display, or otherwise interact with transmitted content, messages, or communications via one or more communication channels 154. In a non-limiting example, processor 102 may transmit a communication instance 158 of the optimized sequential listing 146 to a plurality of client devices 160 using multiple communication channels 154 to ensure broad and targeted content delivery. In an embodiment, client devices 160 may include smartphones, tablet computers, desktop computers, smart televisions, or other network-connected platforms capable of receiving digital media transmissions. Each client device 160 may be configured to receive specific communications according to the segment or cluster 138 to which the corresponding entity belongs, thereby enabling personalized and time-optimized content delivery. In a non-limiting example, processor 102 may format and transmit digital content through channels such as email networks, mobile applications, web interfaces, or streaming services, ensuring that each communication instance 158 is displayed natively within the client device's supported environment. In an embodiment, the processor 102 may employ device recognition and session tracking technologies to confirm successful delivery and to record engagement data such as open rates, viewing time, or click activity. Without limitation, the plurality of client devices 160 may represent distinct audience endpoints across different regions or platforms, allowing the optimized sequential listing 146 to be executed in a synchronized, scalable manner. This configuration may ensure that each communication instance 158 reaches its intended audience efficiently, maintaining the strategic timing, frequency, and content sequencing determined by the system's predictive modeling process.

With continued reference to FIG. 1, the at least a processor 102 may be further configured to receive the communication instance 158 comprising a video 162 associated with the entity 112 from a third party device 164. As used in this disclosure, a "video" is a digital media file or streaming content format comprising sequential visual frames configured for playback, display, or transmission through one or more communication channels 154. Without limitation, the video 162 may be combined with audio. As used in this disclosure, a "third party device" is an external computing system, server, or hardware apparatus 100 operated by an independent source or upstream provider that transmits data, media content, or communication instances 158 to the processor 102 for further processing, distribution, or analysis. In a non-limiting example, processor 102 may be configured to receive a communication instance 158 comprising a video 162 associated with an entity 112 from a third party device 164. In an embodiment, the third party device 164 may include an external advertising server, content management platform, or upstream media distribution system responsible for supplying pre-rendered video 162 advertisements or promotional assets. The processor 102 may establish a secure data connection using standardized communication protocols such as Hypertext Transfer Protocol Secure, Transmission Control Protocol, or Secure File Transfer Protocol to receive the video 162 content for processing and scheduling. In a non-limiting example, the received video 162 may represent a digital advertisement or branded media segment that forms part of the entity's campaign materials. The processor 102 may extract relevant metadata, including duration, resolution, and target audience identifiers, to integrate the video 162 into the optimized sequential listing 146 for subsequent delivery to client devices 160. In an embodiment, the processor 102 may further analyze the video's engagement potential by referencing historical performance metrics 130 or content similarity scores within the system's predictive model. Without limitation, this configuration may enable seamless integration between external content suppliers and the campaign optimization apparatus 100, allowing the system to incorporate newly received video 162 materials from third party devices 164 directly into active scheduling pipelines for coordinated distribution across multiple communication channels 154.

With continued reference to FIG. 1, the at least a processor 102 may be further configured to simultaneously publish the communication instance 158 of the optimized sequential listing 146 across a plurality of digital platforms 166, including one or more streaming networks 168. As used in this disclosure, a "digital platform" is an online or network-based environment, system, or service that facilitates the distribution, display, interaction, or management of digital content, communications, or media assets to end users or entities through connected devices. As used in this disclosure, a "streaming network" is a digital content delivery system configured to transmit continuous media. In an embodiment, the media may include audio, video 162, and/or multimedia data in real time or near real time to client devices 160 over a network connection without requiring full file download prior to playback. In a non-limiting example, processor 102 may be configured to simultaneously publish the communication instance 158 of the optimized sequential listing 146 across a plurality of digital platforms 166, including one or more streaming networks 168, to ensure synchronized and widespread content distribution. In an embodiment, digital platforms 166 may include social media services, content hosting sites, advertising networks, or proprietary brand applications that collectively form the ecosystem through which an entity's campaign materials are deployed. The processor 102 may format and transmit communication instances 158 such as video 162 advertisements, promotional content, or audience-targeted messages in platform-compatible structures to ensure consistent playback and analytics tracking. In a non-limiting example, streaming networks 168 may include online video 162 services, subscription-based streaming applications, live broadcast networks, and the like that deliver multimedia content to client devices 160 in real time. In an embodiment, processor 102 may manage simultaneous publishing across these streaming networks 168 using automated scheduling and synchronization protocols that align with the optimized sequential listing 146 timing and segmentation parameters. Without limitation, this configuration may allow the apparatus 100 to coordinate multi-channel publishing with precision, ensuring that each communication instance 158 is delivered concurrently across diverse digital platforms 166 and streaming networks 168 to maximize reach, engagement, and campaign performance efficiency. In a non-limiting example, processor 102 may employ a combination of network communication technologies, cloud-based infrastructure, and automated publishing frameworks to simultaneously transmit and publish the communication instance 158 of the optimized sequential listing 146 across multiple digital platforms 166, including one or more streaming networks 168. In an embodiment, the processor 102 may interface with each digital platform 166 through standardized application programming interfaces that allow automated uploading, scheduling, and metadata synchronization of the communication instance 158. These interfaces may be authenticated using secure tokens or encrypted credentials managed through an identity and access management system to ensure controlled and verifiable publication. In an embodiment, the processor 102 may utilize cloud orchestration services that coordinate the simultaneous distribution of media assets across geographically distributed servers. Technologies such as content delivery networks may be implemented to cache and deliver media files efficiently, minimizing latency and ensuring consistent playback quality across client devices 160. Without limitation, the processor 102 may employ message queue systems, event-driven frameworks, or parallel processing pipelines that enable real-time deployment of the communication instance 158 to multiple endpoints simultaneously. In a non-limiting example, the processor 102 may encode the communication instance 158, such as a video 162 advertisement or digital asset, into multiple formats optimized for the target platforms and streaming networks 168. The apparatus 100 may use streaming protocols including Hypertext Transfer Protocol Live Streaming or Dynamic Adaptive Streaming over HTTP to transmit video 162 content in adaptive bitrates suitable for varied network conditions. In an embodiment, the processor 102 may maintain platform-specific integration modules to support simultaneous publication to social media networks, streaming services, and advertising exchanges. Without limitation, this configuration allows synchronized, multi-channel publication of campaign materials while preserving alignment with the optimized sequential listing's transmission schedule and audience segmentation strategy.

With continued reference to FIG. 1, the at least a processor 102 may be further configured to log performance metrics 170 associated with the communication instance 158 and retrain the one or more regression-based models 120 as a function of the logged performance metrics 170. As used in this disclosure, "performance metrics" are quantifiable indicators or measurements that evaluate the effectiveness, responsiveness, or success of a communication instance 158, campaign, or system process based on observed outcomes and data-driven results. In a non-limiting example, processor 102 may be configured to log performance metrics 170 associated with each communication instance 158 to capture detailed feedback on how the transmitted content performs across digital platforms 166 and streaming networks 168. In an embodiment, performance metrics 170 may include numerical and temporal data such as view counts, click-through rates, completion rates, engagement durations, conversion ratios, or response times. The processor 102 may automatically collect and store these metrics in a structured analytics database for ongoing evaluation and model refinement. In an embodiment, the logged performance metrics 170 may be used to retrain the one or more regression-based models 120, allowing the system to continuously improve predictive accuracy and campaign optimization. The processor 102 may analyze changes in audience behavior, segment responsiveness, and timing effectiveness as reflected in the performance metrics 170 to adjust regression coefficients or weighting factors. Without limitation, this retraining process may employ automated feedback loops that periodically evaluate whether actual performance aligns with predicted outcomes, updating the models accordingly. In a non-limiting example, if logged performance metrics 170 indicate a decline in audience engagement or a shift in optimal viewing times, the processor 102 may dynamically adjust model parameters to generate a revised optimized sequential listing 146 for future transmissions. Without limitation, this configuration enables the system to operate as a self-learning predictive framework, ensuring that campaign timing, targeting, and content sequencing remain aligned with evolving audience trends and platform behaviors.

With continued reference to FIG. 1, the at least a processor 102 may be further configured to receive interaction data 172 in response to the communication instance 158 and redefine the segments 136 of the cluster 138 as a function of the interaction data 172. As used in this disclosure, "interaction data" is information generated as a result of user or entity engagement with a transmitted communication instance 158, representing measurable responses, actions, or behavioral indicators that occur during or after the delivery of digital content. In a non-limiting example, processor 102 may be configured to receive interaction data 172 in response to the communication instance 158 to evaluate how audience members or entities engage with transmitted content across digital platforms 166 and streaming networks 168. In an embodiment, interaction data 172 may include measurable actions such as video 162 plays, pauses, skips, likes, shares, comments, click-throughs, or conversions that are recorded by tracking components embedded within the communication instance 158. The processor 102 may collect and aggregate this data in real time through analytics application programming interfaces, tracking pixels, or embedded event listeners. In an embodiment, processor 102 may utilize the received interaction data 172 to redefine the segments 136 of the cluster 138 as a function of newly observed behavioral patterns. For example, if interaction data 172 reveals that a subset of users consistently engages with longer-form content, the processor 102 may reclassify those users into a new or modified segment representing high-duration viewers. Without limitation, the apparatus 100 may apply clustering algorithms or statistical classification techniques to dynamically update segment boundaries based on engagement frequency, interaction depth, or conversion likelihood. In a non-limiting example, the processor 102 may continuously monitor interaction data 172 to refine audience segmentation, ensuring that each segment reflects the most recent and relevant behavioral insights. This process allows the system to adjust future communication strategies, optimize targeting precision, and enhance predictive accuracy within regression-based models 120. Without limitation, interaction data 172 thus serves as an adaptive feedback mechanism that enables the system to evolve in real time, improving campaign responsiveness, personalization, and overall performance outcomes. In a non-limiting example, processor 102 may receive interaction data 172 through secure network communication pathways that link client devices 160, digital platforms 166, and analytics systems to the campaign management infrastructure. The processor 102 may collect interaction data 172 in real time or at scheduled intervals, depending on the configuration of the communication channels 154 and platform integrations. In an embodiment, interaction data 172 may be transmitted through application programming interfaces, webhooks, or secure data streams that report user engagement activity directly from hosting platforms or embedded tracking modules. In an embodiment, the communication instance 158 may include embedded analytics tags, tracking pixels, or event listeners that record user behaviors such as clicks, scrolls, pauses, or content completion. These data collection components may transmit interaction data 172 back to the processor 102 via encrypted channels using Hypertext Transfer Protocol Secure, Transmission Control Protocol, or WebSocket connections. Without limitation, interaction data 172 may also be transmitted through cloud-based analytics dashboards or third-party measurement systems that automatically synchronize engagement metrics with the processor's central analytics database. In a non-limiting example, the processor 102 may employ asynchronous data collection mechanisms, allowing it to receive interaction data 172 from multiple digital platforms 166 and streaming networks 168 simultaneously without interrupting ongoing campaign operations. Data packets may be time-stamped, formatted in JavaScript Object Notation or Extensible Markup Language, and validated for integrity before being processed. Without limitation, this configuration enables continuous, reliable receipt of interaction data 172 across diverse communication ecosystems, allowing processor 102 to maintain up-to-date audience engagement records for refining segmentation, retraining predictive models, and optimizing future transmission strategies.

With continued reference to FIG. 1, the client devise, the third party device 164, and the digital platforms 166 each may include a user interface. As used in this disclosure, a "user interface" is a collection of hardware and/or software components configured to enable interaction between a user and a computing device, wherein the user interface facilitates the presentation of data to the user and the reception of input from the user. The user interface may include, without limitation, graphical user interfaces, command-line interfaces, application programming interfaces, voice-based interfaces, haptic interfaces, or augmented reality interfaces. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, in an embodiment, the graphical user interface and an event handler may operate together to enable seamless interaction between the user and the apparatus 100. The GUI serves as the visual and interactive layer through which the user engages with the apparatus 100, presenting elements such as buttons, sliders, input fields, and informational displays. The event handler, on the other hand, functions as the underlying mechanism that monitors and responds to user interactions with the GUI. For example, when a user clicks a button on the GUI to request an explanation of a concept, the event handler may detect the click event, identify its context, and trigger the appropriate processes within the apparatus 100 to generate a tailored response. This interplay may ensure dynamic and responsive system behavior, as the event handler processes various input events such as clicks, taps, keystrokes, or voice commands, and relays these inputs to the relevant system components. The GUI subsequently updates to reflect the system's responses, such as displaying output, modifying visual elements, or providing real-time feedback. Together, the GUI and event handler create an intuitive and interactive experience, bridging user actions and system functionality to achieve efficient and personalized outcomes.

With continued reference to FIG. 1, an "event handler," as used in this disclosure, is a module, data structure, function, and/or routine that performs an action in response to an event. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, as used in this disclosure, a "visual element" is a component or feature within a system, display, or interface that conveys information through visual means. In a non-limiting example, the visual element may include text, images, icons, shapes, colors, and/or other graphical components designed to be perceived by the user. In a non-limiting example, the visual element may aid in communication, navigation, and/or interaction with the system. Without limitation, the visual element may be used to enhance user experience, guide behavior, and/or represent data visually in an intuitive or informative way. A visual element may include data transmitted to display device, client device 160, and/or graphical user interface. In some embodiments, visual element may be interacted with. For example, visual element may include an interface, such as a button or menu. In some embodiments, visual element may be interacted with using a user device such as a smartphone, tablet, smartwatch, or computer.

With continued reference to FIG. 1, in an embodiment, the apparatus 100 and or the downstream device may include a data structure. As used in this disclosure, "data structure" is a way of organizing data represented in a specialized format on a computer configured such that the information can be effectively presented in a graphical user interface. In some cases, the data structure includes any input data. In some cases, the data structure contains data and/or rules used to visualize the graphical elements within a graphical user interface. In some cases, the data structure may include any data described in this disclosure. In some cases, the data structure may be configured to modify the graphical user interface, wherein data within the data structure may be represented visually by the graphical user interface. In some cases, the data structure may be continuously modified and/or updated by processor 102, wherein elements within graphical user interface may be modified as a result. In some cases, processor 102 may be configured to transmit display device and or the downstream device the data structure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals there between may include, without limitation, electrical, electromagnetic, magnetic, video 162, audio, radio, and microwave data and/or signals, combinations thereof, and the like, among others. Processor 102 may transmit the data described above to a database wherein the data may be accessed from the database. Processor 102 may further transmit the data above to a display device, client device 160, or another computing device. The data structure may serve as the organizational framework that stores, retrieves, and manages data required for processing events and updating the GUI. The data structure may act as a bridge between the user's input, captured by the event handler, and the output displayed on the GUI, ensuring that information is handled efficiently and accurately throughout the interaction. For example, without limitation, when a user interacts with a dropdown menu in the GUI to select a topic, the event handler may capture this input and accesses a data structure. The data structure may retrieve the relevant information such as, text explanations, videos 162, or interactive exercises, and passes it back to the event handler, which may then trigger the appropriate updates to the GUI. In another embodiment, the data structure may also maintain the state of the system, tracking user progress, preferences, and session history. For instance, without limitation, a hash table may store user specific configurations which the event handler references when processing interactions. The GUI may then dynamically adapt to display content aligned with these configurations. This integration may ensure that user inputs are seamlessly translated into meaningful system outputs, with the data structure enabling rapid access, consistency, and scalability throughout the process. As used in this disclosure, a "hash table" is a data structure that stores data in a way that allows for fast retrieval, insertion, and deletion of elements. The hash table may organize data into key-value pairs, where each key is unique and used to identify its corresponding value. A hash table may use a hash function to compute an index, or hash code, from the key, which determines where the key-value pair is stored within an array or list.

With continued reference to FIG. 1, as used in this disclosure, an "interactive element" is a component or feature within a graphical user interface (GUI) that allows users to perform actions, provide input, or engage with the apparatus 100. Interactive elements may be designed to facilitate two-way communication between the user and the system, enabling the user to influence the behavior of the apparatus or obtain feedback in response to their actions. Examples of interactive elements may include buttons, dropdown menus, sliders, checkboxes, input fields, and hyperlinks. More advanced interactive elements may include drag-and-drop interfaces, interactive diagrams, or dynamically updating content areas that respond to user actions in real time. The interactive elements may enhance user engagement by providing intuitive and responsive mechanisms for interacting with the system. Interactive elements may operate by responding to user actions such as clicks, taps, swipes, or keyboard inputs, and triggering predefined system behaviors or processes. The execution of the interactive elements may require a combination of front-end and back-end technologies that work together to provide seamless functionality and user interaction. On the front end, technologies such as HTML and CSS may define the structure, appearance, and layout of the interactive elements, while JavaScript may enable dynamic functionality. For example, without limitation, JavaScript may detect when the user clicks a button and trigger actions or animations. Front-end frameworks like React, Angular, or Vue.js may further enhance development by offering reusable components and efficient rendering mechanisms. On the back end, the system may process the user's input, retrieve the necessary data, and communicate with the front end to provide an appropriate response. APIs may act as a bridge between the front end and back end, facilitating data transfer, such as sending a user's form submission to the server and retrieving processed results. Server-side logic, implemented using languages like Python, Java, or Node.js, may handle input processing and return relevant data. Additional supporting technologies may ensure the smooth operation of interactive elements. Event listeners, for instance, may continuously monitor for specific actions like mouse clicks or text entries, executing code when such events are detected. Efficient data structures, such as hash tables or dictionaries, may store interactive state data, such as user preferences or settings, for quick access and updates. Databases, including MySQL or MongoDB, may manage and store the data required for interactive features, such as user profiles or historical activity. Communication technologies may also help maintain the responsiveness of interactive elements. AJAX (Asynchronous Javascript and XML) may allow the front end to update portions of a web page without requiring a full page reload, enhancing responsiveness. WebSockets may provide real-time interaction capabilities, such as live chats or collaborative tools, by enabling persistent communication between the client and the server. Without limitation, the apparatus 100 may include one or more APIs. As used in this disclosure, an "application programming interface (API)" is a set of defined protocols, tools, and methods that allow different software applications, systems, or components to communicate and interact with each other. An API may act as an intermediary that enables a client application, such as a user-facing app, to send requests to a server or service and receive the necessary responses, facilitating seamless integration and functionality across diverse systems.

With continued reference to FIG. 1, as used in this disclosure, "downstream device" is a device that accesses and interacts with apparatus 100. For instance, and without limitation, downstream device may include a remote device and/or apparatus 100. In a non-limiting embodiment, downstream device may be consistent with a computing device as described in the entirety of this disclosure. Without limitation, the downstream device may include a display device. As used in this disclosure, a "display device" refers to an electronic device that visually presents information to the entity 112. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video 162 among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user-interface (GUI) to a user, wherein a user may interact with a GUI. In some cases, a user may view a GUI through a display. Additionally, or alternatively, processor 102 be connected to display device. In one or more embodiments, transmitting the communication instance 158 may include displaying the communication instance 158 at display device using a visual interface.

With continued reference to FIG. 1, in one or more embodiments, apparatus 100 provide a solution to inefficient or manually timed marketing video releases. The disclosed apparatus 100 includes a multi-channel deployment system that employs predictive algorithms to automatically determine optimal release times, audience segmentation, and impression frequencies based on real-time and historical data inputs. This improves the timing precision and coordination of marketing video asset distribution while reducing manual intervention and system latency. In a non-limiting example, another improvement provided by apparatus 100 is implementing regression-based models that process data such as historical ad performance, regional engagement metrics, and case-type targeting to generate optimized release schedules. This provides a solution to the problem of static campaign planning and limited responsiveness to evolving audience patterns or market dynamics. In some embodiments, a further improvement is achieved through apparatus 100 which is capable of automated, synchronized cross-platform publishing, providing a solution to the problem of inconsistent or fragmented campaign execution across multiple digital and streaming networks. Continuing, by coordinating release operations through an integrated deployment framework, the apparatus 100 ensures consistent timing and maximized audience reach. In addition, the apparatus 100 provides a solution to the problem of limited campaign learning and optimization by logging performance outcomes into a feedback-driven model that continually retrains predictive scheduling algorithms. This self-adaptive feature may enhance long-term campaign efficiency and predictive reliability across successive marketing cycles.

Figure 2:
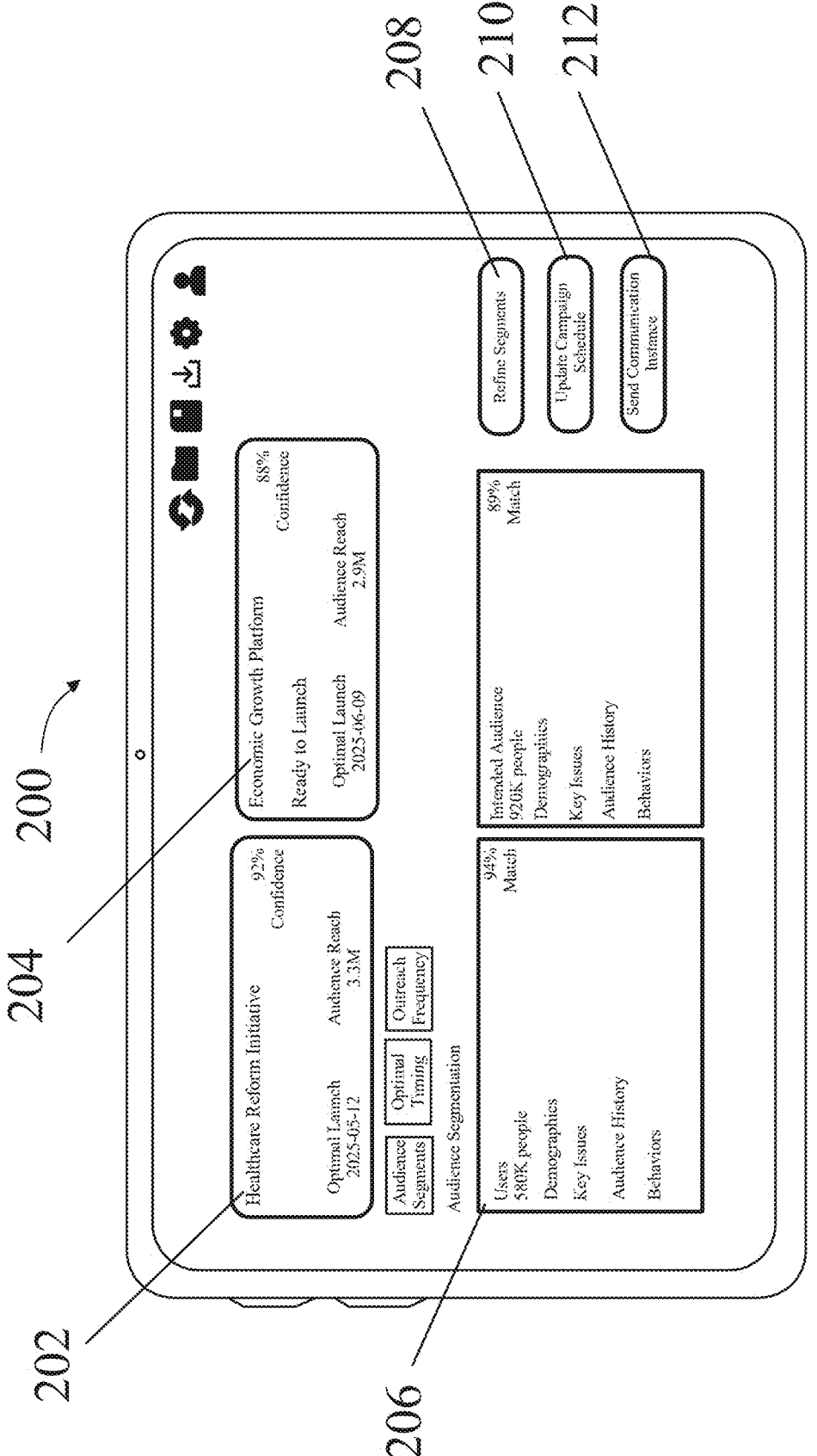
FIG. 2 is an exemplary illustration of a graphical user interface.

Referring now to FIG. 2, an exemplary illustration 200 of a graphical user interface. The graphical user interface may be displayed on a client device operated by a user or system administrator to visualize and control campaign scheduling operations. In an embodiment, the exemplary illustration 200 may include a first display region 202 configured to present one or more active or pending program campaigns. The first display region 202 may show identifiers such as campaign titles, launch readiness status, optimal launch dates, confidence levels, and projected audience reach. In a non-limiting example, a campaign such as "Healthcare Reform Initiative" may be displayed with a confidence indicator and calculated optimal launch date derived from regression-based model outputs. In an embodiment, the exemplary illustration 200 may include a second display region 204 configured to present additional campaigns or comparative analytics for multiple program entities. The second display region may show side-by-side data representations including optimal launch timing, engagement projections, and total intended audience size. Without limitation, the second display region may allow a user to evaluate campaign readiness and prioritize which programs should be transmitted first based on predicted reach and confidence scoring. In an embodiment, the exemplary illustration 200 may include an audience segmentation panel 206 configured to display data describing user demographics, behavioral indicators, historical engagement, and key interest categories. The audience segmentation panel 206 may further include selection options such as "Audience Segments," "Optimal Timing," and "Outreach Frequency," allowing the user to review the analytical basis for the generated transmission schedule. In a non-limiting example, the audience segmentation panel 206 may illustrate how users are grouped by demographic similarity, viewing habits, or responsiveness metrics determined by the processor. In an embodiment, the exemplary illustration 200 may include a refine segments control 208 that allows the user to modify audience segmentation parameters based on updated analytics data or interaction trends. The refine segments control 208 may initiate a recalculation process in which the processor redefines clusters and engagement scores in real time. In an embodiment, the exemplary illustration 200 may include an update campaign schedule control 210 that enables the user to adjust transmission timing or delivery order based on changes detected in analytics data, key events, or system performance. The update campaign schedule control 210 may trigger the processor to regenerate the optimized sequential listing and recalculate the transmission schedule using the latest model outputs. In an embodiment, the exemplary illustration 200 may include a send communication instance control 212 that allows the user to initiate transmission of the optimized sequential listing across communication channels 154. The send communication instance control 212 may activate the processor's publication protocol, enabling simultaneous deployment of the campaign to multiple client devices, digital platforms, and streaming networks as determined by the optimized schedule.

Figure 3:
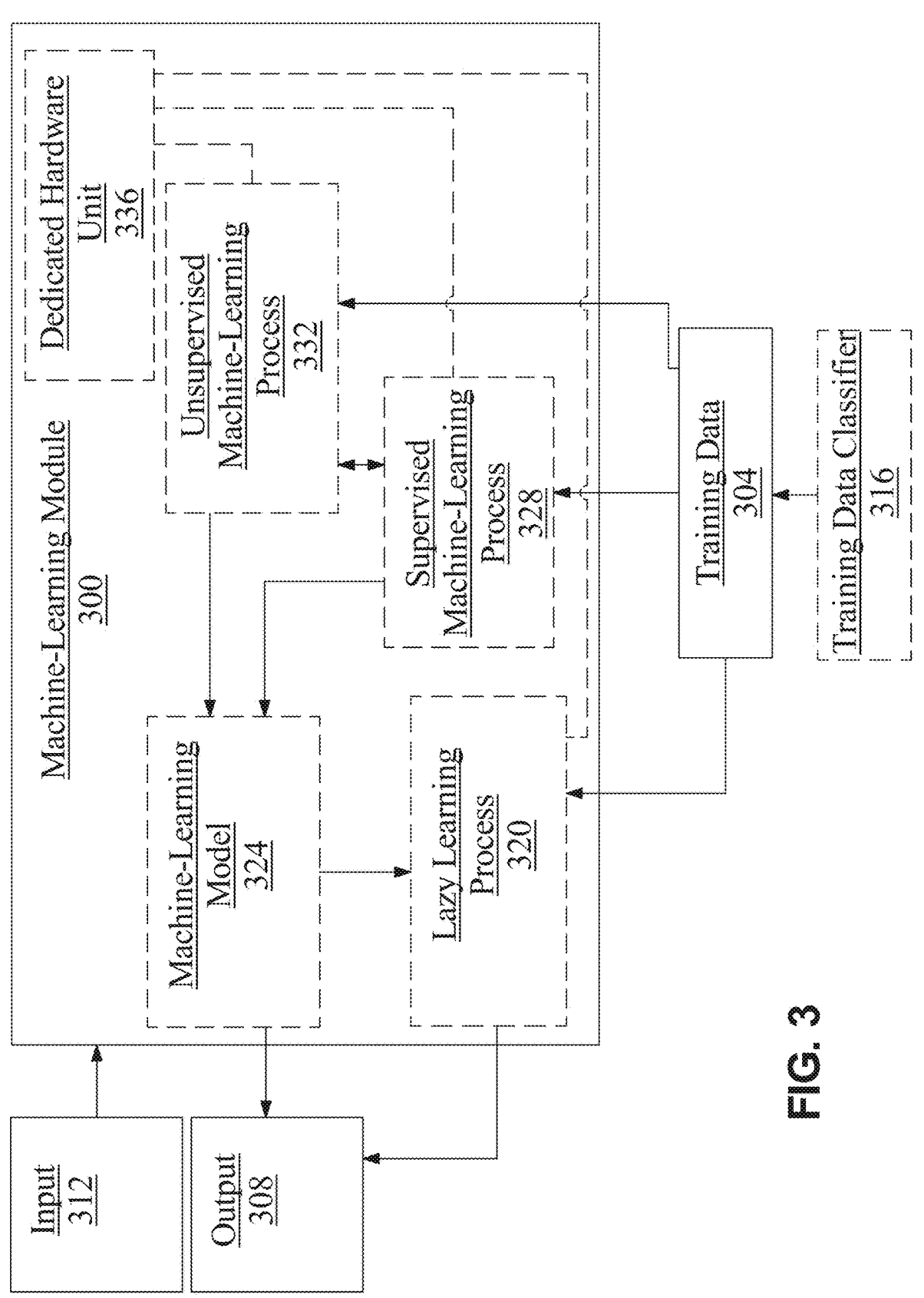
FIG. 3 is a block diagram of an exemplary machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example input data may include the plurality of input data which may include analytics data, profile data, event data, and the like, and the outputs may include communication instances.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to characterize a sub-population such as a cohort of audience segments, program campaigns, or related content distributions for which a subset of training data may be selected. In an embodiment, the classifier may group data according to demographic similarity, behavioral response patterns, or geographic distribution to isolate subsets that exhibit distinct engagement characteristics. Without limitation, the classifier may also categorize training data based on event influence, device usage trends, or temporal performance intervals, enabling the processor to apply targeted model training that reflects the specific dynamics of each identified sub-population.

Still referring to FIG. 3, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)$ $P(A) \div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or
both. As used in this disclosure, a "low-pass filter" is a filter
that passes signals with a frequency lower than a selected
cutoff frequency and attenuates signals with frequencies
higher than the cutoff frequency. The exact frequency
response of the filter depends on the filter design. Computing
device, processor, and/or module may use averaging, such as
luma or chroma averaging in images, to fill in data units in
between original data units.

In some embodiments, and with continued reference to
FIG. 3, computing device, processor, and/or module may
down-sample elements of a training example to a desired
lower number of data elements. As a non-limiting example,
a high pixel count image may have 256 pixels, however a
desired number of pixels may be 128. Processor may down-
sample the high pixel count image to convert the 256 pixels
into 128 pixels. In some embodiments, processor may be
configured to perform downsampling on data. Downsam-
pling, also known as decimation, may include removing
every Nth entry in a sequence of samples, all but every Nth
entry, or the like, which is a process known as "compres-
sion," and may be performed, for instance by an N-sample
compressor implemented using hardware or software. Anti-
aliasing and/or anti-imaging filters, and/or low-pass filters,
may be used to clean up side-effects of compression.

Further referring to FIG. 3, feature selection includes
narrowing and/or filtering training data to exclude features
and/or elements, or training data including such elements,
that are not relevant to a purpose for which a trained
machine-learning model and/or algorithm is being trained,
and/or collection of features and/or elements, or training
data including such elements, on the basis of relevance or
utility for an intended task or purpose for a trained machine-
learning model and/or algorithm is being trained. Feature
selection may be implemented, without limitation, using any
process described in this disclosure, including without limi-
tation using training data classifiers, exclusion of outliers, or
the like.

With continued reference to FIG. 3, feature scaling may
include, without limitation, normalization of data entries,
which may be accomplished by dividing numerical fields by
norms thereof, for instance as performed for vector normal-
ization. Feature scaling may include absolute maximum
scaling, wherein each quantitative datum is divided by the
maximum absolute value of all quantitative data of a set or
subset of quantitative data. Feature scaling may include
min-max scaling, in which each value X has a minimum
value $X_{min}$ in a set or subset of values subtracted therefrom,
with the result divided by the range of the values, give
maximum value in the set or subset $X_{max}$:

$$X_{new} = \frac{X - X_{min}}{X_{max} - X_{min}}.$$

Feature scaling may include mean normalization, which
involves use of a mean value of a set and/or subset of values,
$X_{mean}$ with maximum and minimum values:

$$X_{new} = \frac{X - X_{mean}}{X_{max} - X_{min}}.$$

Feature scaling may include standardization, where a dif-
ference between X and $X_{mean}$ is divided by a standard
deviation $\sigma$ of a set or subset of values:

$$X_{new} = \frac{X - X_{mean}}{\sigma}.$$

Scaling may be performed using a median value of a set or
subset $X_{median}$ and/or interquartile range (IQR), which rep-
resents the difference between the $25^{th}$ percentile value and
the $50^{th}$ percentile value (or closest values thereto by a
rounding protocol), such as:

$$X_{new} = \frac{X - X_{median}}{IQR}.$$

Persons skilled in the art, upon reviewing the entirety of this
disclosure, will be aware of various alternative or additional
approaches that may be used for feature scaling.

Still referring to FIG. 3, machine-learning module 300
may be configured to perform a lazy-learning process 320
and/or protocol, which may alternatively be referred to as a
"lazy loading" or "call-when-needed" process and/or proto-
col, may be a process whereby machine learning is con-
ducted upon receipt of an input to be converted to an output,
by combining the input and training set to derive the
algorithm to be used to produce the output on demand. For
instance, an initial set of simulations may be performed to
cover an initial heuristic and/or "first guess" at an output
and/or relationship. As a non-limiting example, an initial
heuristic may include a ranking of associations between
inputs and elements of training data 304. Heuristic may
include selecting some number of highest-ranking associa-
tions and/or training data 304 elements. Lazy learning may
implement any suitable lazy learning algorithm, including
without limitation a K-nearest neighbors algorithm, a lazy
naïve Bayes algorithm, or the like; persons skilled in the art,
upon reviewing the entirety of this disclosure, will be aware
of various lazy-learning algorithms that may be applied to
generate outputs as described in this disclosure, including
without limitation lazy learning applications of machine-
learning algorithms as described in further detail below.

Alternatively or additionally, and with continued refer-
ence to FIG. 3, machine-learning processes as described in
this disclosure may be used to generate machine-learning
models 324. A "machine-learning model," as used in this
disclosure, is a data structure representing and/or instanti-
ating a mathematical and/or algorithmic representation of a
relationship between inputs and outputs, as generated using
any machine-learning process including without limitation
any process as described above, and stored in memory; an
input is submitted to a machine-learning model 324 once
created, which generates an output based on the relationship
that was derived. For instance, and without limitation, a
linear regression model, generated using a linear regression
algorithm, may compute a linear combination of input data
using coefficients derived during machine-learning pro-
cesses to calculate an output datum. As a further non-
limiting example, a machine-learning model 324 may be
generated by creating an artificial neural network, such as a
convolutional neural network comprising an input layer of
nodes, one or more intermediate layers, and an output layer
of nodes. Connections between nodes may be created via the
process of "training" the network, in which elements from a
training data 304 set are applied to the input nodes, a suitable
training algorithm (such as Levenberg-Marquardt, conjugate
gradient, simulated annealing, or other algorithms) is then
used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include the plurality of input data which may include analytics data, profile data, event data, and the like, as described above as inputs, communication instances as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including, without limitation, support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
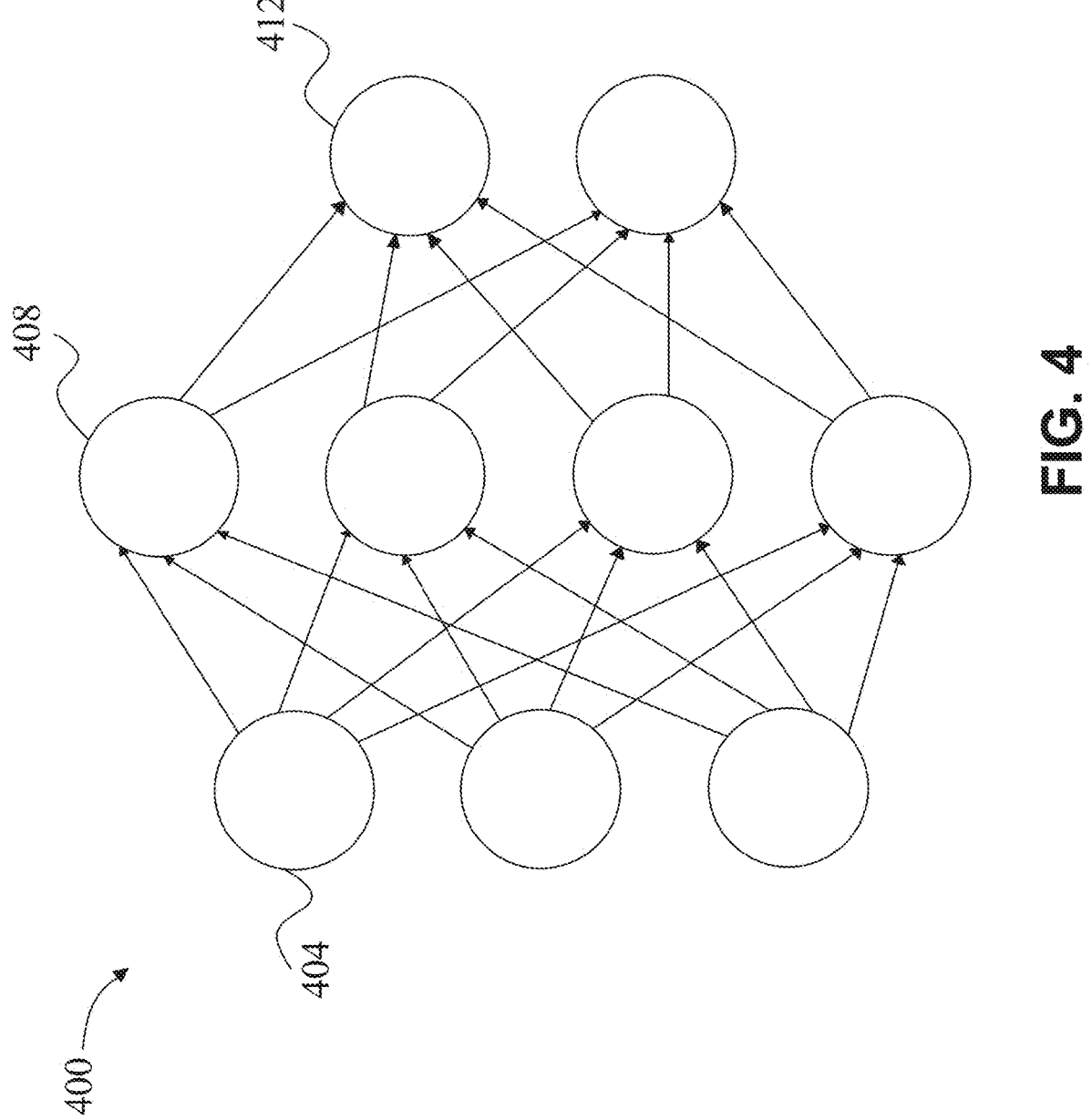
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
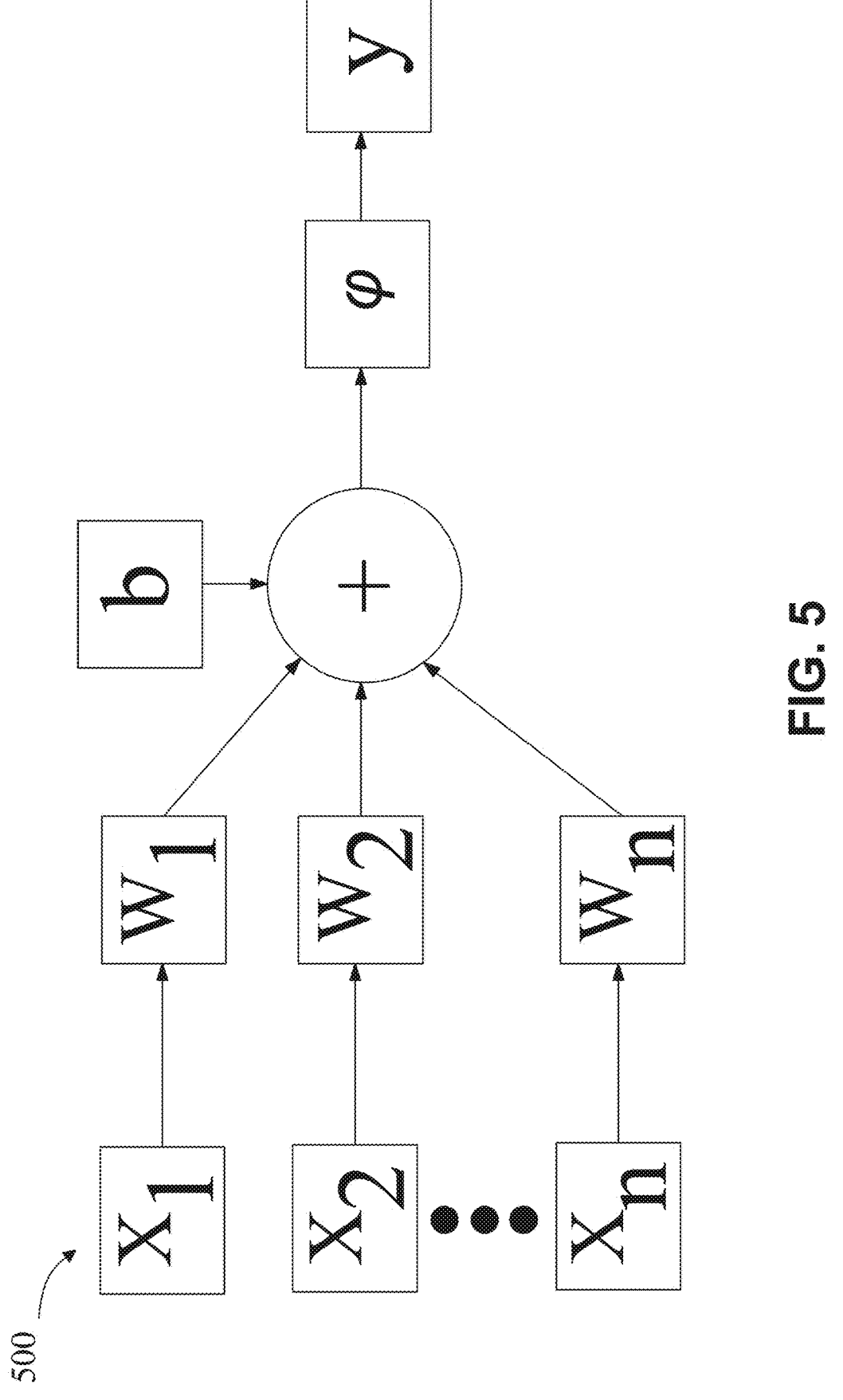
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+ \tanh (\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring now to FIG. 6, a flow diagram of an exemplary method 600 of generating an optimized sequential listing is illustrated. At step 605, method 600 includes receiving, using at least a processor, a plurality of input data comprising analytics data and profile data associated with an entity. In an embodiment, the analytics data may include historical program data associated with historical entities and wherein the profile data comprises a plurality of entity data. This may be implemented as described and with reference to FIGS. 1-5.

Still referring to FIG. 6, at step 610, method 600 includes determining, using one or more regression-based models, an optimal transmission time as a function of the plurality of input data by identifying key events of a plurality of events associated with the profile data. In an embodiment, the at least a processor may be further configured to train the one or more regression-based models using model training data, wherein the model training data comprises historical performance metrics associated with clusters. In an embodiment, the at least a processor may be further configured to filter the plurality of events based on thresholds associated with the entity. This may be implemented as described and with reference to FIGS. 1-5.

Still referring to FIG. 6, at step 615, method 600 includes determining, using the at least a processor, segments of a cluster associated with the entity as a function of the profile data. In an embodiment, the at least a processor may be further configured to predict engagement scores for the segments of the cluster as a function of cluster data. This may be implemented as described and with reference to FIGS. 1-5.

Still referring to FIG. 6, at step 620, method 600 includes determining, using the at least a processor, a frequency of impressions as a function of the analytics data. This may be implemented as described and with reference to FIGS. 1-5.

Still referring to FIG. 6, at step 625, method 600 includes generating, using the at least a processor, an optimized sequential listing as a function of the optimal transmission time, the segments, and the frequency of impressions. In an embodiment, the at least a processor may be further configured to aggregate, using a web crawler, new events of the plurality of events, generate an updated optimized sequential listing as a function of the new events, and transmit, using the plurality of communication channels, an updated communication instance of the updated optimized sequential listing. This may be implemented as described and with reference to FIGS. 1-5.

Still referring to FIG. 6, at step 630, method 600 includes transmitting, using a plurality of communication channels, a communication instance of the optimized sequential listing to a plurality of client devices. In an embodiment, the at least a processor may be further configured to receive the communication instance comprising a video associated with the entity from a third party device. In an embodiment, the at least a processor may be further configured to simultaneously publish the communication instance of the optimized sequential listing across a plurality of digital platforms, including one or more streaming networks. In an embodiment, the at least a processor may be further configured to log performance metrics associated with the communication instance and retrain the one or more regression-based models as a function of the logged performance metrics. In an embodiment, the at least a processor may be further configured to receive interaction data in response to the communication instance and redefine the segments of the cluster as a function of the interaction data. This may be implemented as described and with reference to FIGS. 1-5

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
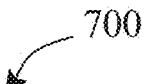
FIG. 7 is a block diagram of a computing system that can be used to implement any one or more of the methodologies disclosed herein and any one or more portions thereof.

FIG. 7 shows a diagrammatic representation of one embodiment of computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display device 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating an optimized sequential listing, wherein the apparatus comprises:
   at least a computing device, wherein the at least a computing device comprises:
      a memory; and
      at least a processor communicatively connected to the memory, wherein the memory contains instructions configuring the at least a processor to:
         receive a plurality of input data comprising analytics data and profile data associated with an entity;
         determine, using one or more regression-based models, an optimal transmission time as a function of the plurality of input data by identifying key events of a plurality of events associated with the profile data;
         determine segments of a cluster associated with the entity as a function of the profile data;
         determine a frequency of impressions as a function of the analytics data;
         generate an optimized sequential listing as a function of the optimal transmission time, the segments, and the frequency of impressions; and
         transmit, using a plurality of communication channels, a communication instance of the optimized sequential listing to a plurality of client devices.

2. The apparatus of claim 1, wherein the analytics data comprises historical program data associated with historical entities, and wherein the profile data comprises a plurality of entity data.

3. The apparatus of claim 1, wherein the at least a processor is further configured to train the one or more regression-based models using model training data, wherein the model training data comprises historical performance metrics associated with clusters.

4. The apparatus of claim 1, wherein the at least a processor is further configured to:
   aggregate, using a web crawler, new events of the plurality of events;
   generate an updated optimized sequential listing as a function of the new events; and
   transmit, using the plurality of communication channels, an updated communication instance of the updated optimized sequential listing.

5. The apparatus of claim 1, wherein the at least a processor is further configured to predict engagement scores for the segments of the cluster as a function of cluster data.

6. The apparatus of claim 1, wherein the at least a processor is further configured to receive the communication instance comprising a video associated with the entity from a third party device.

7. The apparatus of claim 1, wherein the at least a processor is further configured to filter the plurality of events based on thresholds associated with the entity.

8. The apparatus of claim 1, wherein the at least a processor is further configured to simultaneously publish the communication instance of the optimized sequential listing across a plurality of digital platforms, including one or more streaming networks.

9. The apparatus of claim 1, wherein the at least a processor is further configured to:
   log performance metrics associated with the communication instance; and
   retrain the one or more regression-based models as a function of the logged performance metrics.

10. The apparatus of claim 9, wherein the at least a processor is further configured to:
   receive interaction data in response to the communication instance; and
   redefine the segments of the cluster as a function of the interaction data.

11. A method of generating an optimized sequential listing, wherein the method comprises:
   receiving, using at least a processor, a plurality of input data comprising analytics data and profile data associated with an entity;
   determining, using the at least a processor and one or more regression-based models, an optimal transmission time as a function of the plurality of input data by identifying key events of a plurality of events associated with the profile data;
   determining, using the at least a processor, segments of a cluster associated with the entity as a function of the profile data;
   determining, using the at least a processor, a frequency of impressions as a function of the analytics data;
   generating, using the at least a processor, an optimized sequential listing as a function of the optimal transmission time, the segments, and the frequency of impressions; and
   transmitting, using the at least a processor and a plurality of communication channels, a communication instance of the optimized sequential listing to a plurality of client devices.

12. The method of claim 11, wherein the analytics data comprises historical program data associated with historical entities, and wherein the profile data comprises a plurality of entity data.

13. The method of claim 11, further comprising training, using the at least a processor, the one or more regression-based models using model training data, wherein the model training data comprises historical performance metrics associated with clusters.

14. The method of claim 11, further comprising:
   aggregating, using a web crawler, new events of the plurality of events;
   generating, using the at least a processor, an updated optimized sequential listing as a function of the new events; and transmitting, using the plurality of communication channels, an updated communication instance of the updated optimized sequential listing.

15. The method of claim 11, further comprising predicting, using the at least a processor, engagement scores for the segments of the cluster as a function of cluster data.

16. The method of claim 11, further comprising receiving, using the at least a processor, the communication instance comprising a video associated with the entity from a third party device.

17. The method of claim 11, further comprising filtering, using the at least a processor, the plurality of events based on thresholds associated with the entity.

18. The method of claim 11, further comprising simultaneously publishing, using the at least a processor, the communication instance of the optimized sequential listing across a plurality of digital platforms, including one or more streaming networks.

19. The method of claim 11, further comprising:

logging, using the at least a processor, performance metrics associated with the communication instance; and retraining, using the at least a processor, the one or more regression-based models as a function of the logged performance metrics.

20. The method of claim 19, further comprising:

receiving, using the at least a processor, interaction data in response to the communication instance; and redefining, using the at least a processor, the segments of the cluster as a function of the interaction data.

\* \* \* \* \*